(12) United States Patent
Hoshi (10) Patent No.: US 11,034,527 B2
(45) Date of Patent: Jun. 15, 2021

(54) COMPONENT SUPPLY DEVICE AND CONTROL METHOD FOR COMPONENT SUPPLY DEVICE

(71) Applicant: Nissan Motor Co., Ltd., Kanagawa (JP)

(72) Inventor: Hiromi Hoshi, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 16/345,508

(22) PCT Filed: Oct. 31, 2016

(86) PCT No.: PCT/JP2016/082352
§ 371 (c)(1),
(2) Date: Apr. 26, 2019

(87) PCT Pub. No.: WO2018/078884
PCT Pub. Date: May 3, 2018

(65) Prior Publication Data
US 2019/0276244 A1  Sep. 12, 2019

(51) Int. Cl.
*B65G 47/12* (2006.01)
*B65G 47/78* (2006.01)
(Continued)

(52) U.S. Cl.
CPC ........... *B65G 47/12* (2013.01); *B65G 47/145* (2013.01); *B65G 47/78* (2013.01); *B65G 65/4809* (2013.01); *B65G 2814/0325* (2013.01)

(58) Field of Classification Search
CPC ........ B65G 47/12; B65G 65/30; B65G 47/00; B65G 47/20; B65G 65/48;
(Continued)

(56) References Cited

U.S. PATENT DOCUMENTS 5,074,824 A * 12/1991 Suris ..................... G07D 9/008
453/57
5,322,185 A * 6/1994 Leight .................... A61F 11/08
221/1

(Continued)

FOREIGN PATENT DOCUMENTS

EP  0039004 A2  11/1981
JP  S52-159583 U  12/1977
(Continued)

*Primary Examiner* — Rakesh Kumar
(74) *Attorney, Agent, or Firm* — Osha Bergman Watanabe & Burton LLP (57) ABSTRACT

A component supply device configured to output a predetermined number of components to be used in a work operation includes a fixing plate having a via-hole through which the components pass, the fixing plate being fixed to a housing, a movable plate having a storage hole penetrating through the movable plate in an up-down direction and having a size that allows the predetermined number of components to be stored, the movable plate being laminated on a top side of the fixing plate and configured to move such that the storage hole moves relative to the via-hole in a direction parallel to a top face of the fixing plate, a controller configured to control an operation of the movable plate, and an elastic member placed on a top side of the movable plate and configured to elastically deform in a direction parallel to a top face of the movable plate.

4 Claims, 9 Drawing Sheets

(51) Int. Cl.
*B65G 65/48* (2006.01)
*B65G 47/14* (2006.01)

(58) Field of Classification Search
CPC ............ B65G 2814/0325; B65G 47/78; B65G 65/4809; B65G 47/145
USPC ........................................................ 221/277
See application file for complete search history.

(56) References Cited

U.S. PATENT DOCUMENTS

| | | | | |
|---|---|---|---|---|
| 5,803,309 | A * | 9/1998 | Yuyama | G07F 17/0092 221/27 |
| 6,394,308 | B1 * | 5/2002 | Yuyama | B65G 47/1457 221/265 |
| 6,471,093 | B1 * | 10/2002 | Kodama | B65G 47/1457 221/266 |
| 8,887,603 | B2 * | 11/2014 | Yuyama | B26D 3/30 83/104 |
| 9,710,994 | B2 * | 7/2017 | Omura | G07F 17/0092 |
| 9,974,411 | B2 * | 5/2018 | Righetti | A47J 31/407 |
| 10,453,293 | B2 * | 10/2019 | Schmidt-Ellinger | G07F 11/44 |
| 2005/0269348 | A1 * | 12/2005 | Limback | A47L 15/4409 221/263 |
| 2015/0027286 | A1 * | 1/2015 | Yuyama | B65D 83/04 83/105 |
| 2019/0276244 | A1 * | 9/2019 | Hoshi | B65G 65/4809 |

FOREIGN PATENT DOCUMENTS

| | | | | |
|---|---|---|---|---|
| JP | S56-43830 | U | | 4/1981 |
| JP | S56-166850 | A | | 12/1981 |
| JP | H05-51817 | U | | 7/1993 |
| JP | 6040893 | B | * 6/1994 | ................ A61J 7/00 |
| JP | H07-17636 | A | | 1/1995 |
| JP | 08071248 | A | * 3/1996 | ................ A63F 9/00 |
| JP | H08-71248 | A | | 3/1996 |
| JP | 3155268 | B2 | | 4/2001 |
| JP | 2006-178612 | A | | 7/2006 |
| JP | 2009-193496 | A | | 8/2009 |
| JP | 2013-103792 | A | | 5/2013 |
| KR | 101513152 | B1 | | 4/2015 |

* cited by examiner

COMPONENT SUPPLY DEVICE AND CONTROL METHOD FOR COMPONENT SUPPLY DEVICE

BACKGROUND

Technical Field

The invention relates to a component supply device and a control method thereof.

Related Art

In a production process, a work operation using a component such as a clip or a grommet is performed by taking out only a predetermined number of components to be used in the work operation from a hopper in which many components are stored in advance. However, when the number of components thus taken out is larger than the number of components to be used, unnecessary components are returned to the hopper, and when the number of components is smaller than the number of components to be used, a necessary number of components are taken out from the hopper. In either case, useless work operations should be performed.

JP 2013-103792 A discloses a component supply device configured to output only a predetermined number of components to be used so as to restrain such useless work operations. The component supply device is configured such that a component is supplied, via an inclined supply pipe, from a housing portion in which a lot of components are stored to an output groove provided in the outer periphery of a rotating disk, and in a state where the component stays in the output groove, the rotating disk rotates, so that the component is moved to a discharge port to the outside. Further, in a case where the components have a complicated shape, the components may get entangled. In this regard, the component supply device in the literature includes, as a mechanism for breaking off the entanglement between the components, an excitation rod configured to vibrate in the up-down direction inside the housing portion, and a stirring rod provided on a front surface of the rotating disk.

SUMMARY OF INVENTION

However, in the component supply device of the literature, the entanglement is broken in such a manner that vertical vibrations are given by the excitation rod to the components stored in the housing portion. Accordingly, in a state where a large number of components are stored in the housing portion, the entanglement is hard to be broken, and this might cause deformation or breakage of the components. Further, even in a case where the entanglement is broken by the excitation rod and the stirring rod, if a plurality of components stays in the output groove, a greater number of components than the predetermined number are output.

According to one or more embodiments of the present invention, a component supply device can output only a predetermined number of components to be used in a work operation, and a control method thereof.

According to one or more embodiments of the present invention, a component supply device configured to output a predetermined number of components to be used in a work operation, the component supply device comprises a fixing plate having a via-hole through which the components pass, the fixing plate being fixed to a housing, and a movable plate having a storage hole penetrating through the movable plate in an up-down direction and having a size that allows the predetermined number of components to be stored, the movable plate being laminated on a top side of the fixing plate and configured to move such that the storage hole moves relative to the via-hole in a direction parallel to a top face of the fixing plate. The component supply device further comprises a controlling portion configured to control an operation of the movable plate and an elastic member placed on a top side of the movable plate and configured to elastically deform in a direction parallel to a top face of the movable plate. The controlling portion repeatedly performs the following operations until the predetermined number of components are output, a forward-direction operation of moving the movable plate from a first state in which a top side of the storage hole is opened and a bottom side of the storage hole is closed by the fixing plate to a second state in which the storage hole communicates with the via-hole and the components are movable from the storage hole to the via-hole, and a reverse-direction operation of returning the movable plate to the first state by reversing a moving direction of the movable plate when the movable plate enters the second state. When the movable plate moves in a state where an excessive component enters the storage hole and the component partially projects from an upper end of the storage hole, the elastic member hits the component to remove the projecting component from the storage hole before the movable plate enters the second state, or the elastic member elastically deforms by being pressed by the projecting component, so that, while the movable plate is in the second state, the projecting component is sandwiched between the elastic member and a wall surface of the storage hole due to an elastic force caused by the elastic deformation.

BRIEF DESCRIPTION OF DRAWINGS

FIGS. 8(a)-8(d) show an operation of an elastic member.

DETAILED DESCRIPTION

With reference to the attached drawings, the following describes embodiments of the present invention. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
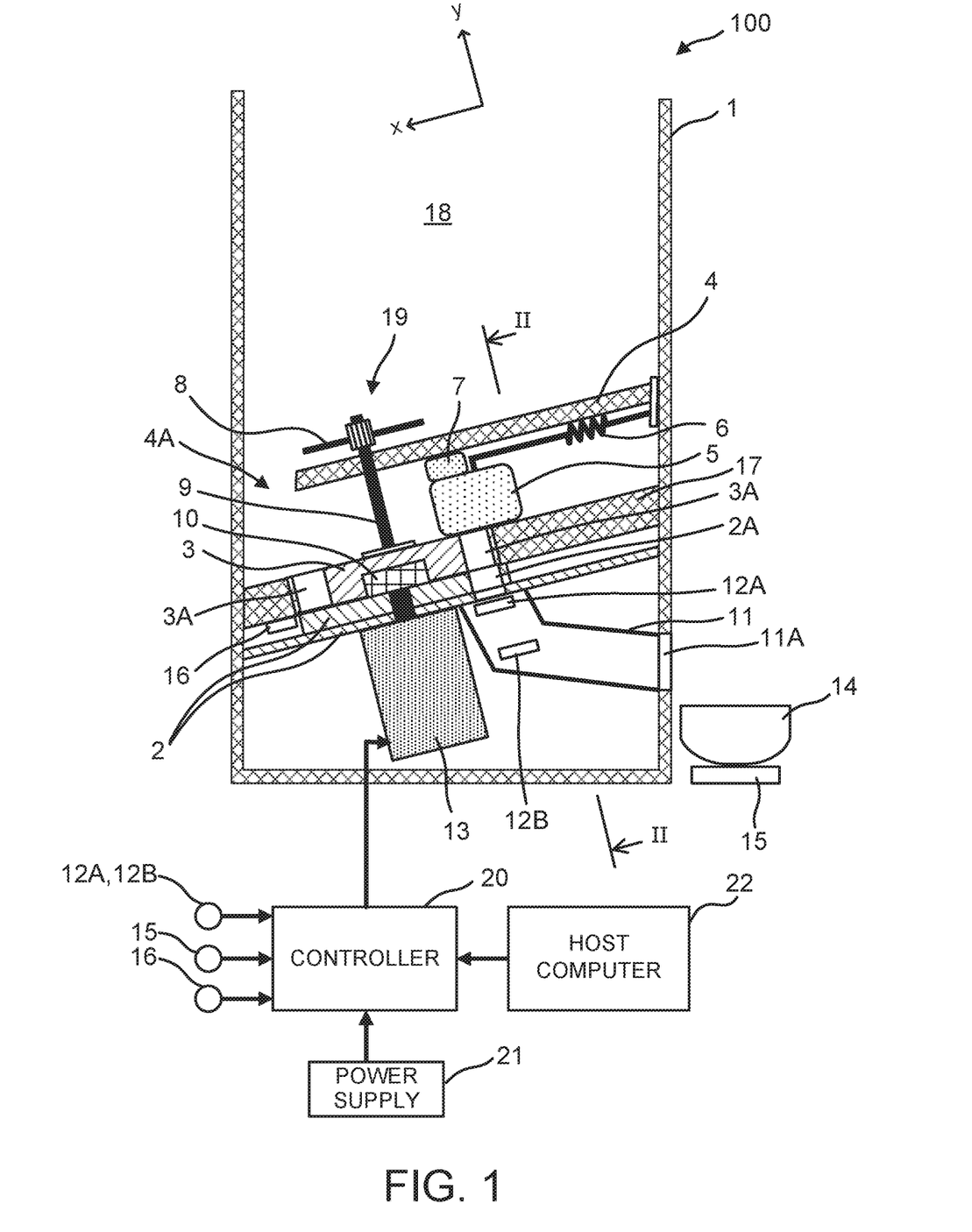
FIG. 1 is a sectional view of a component supply device.
Figure 2:
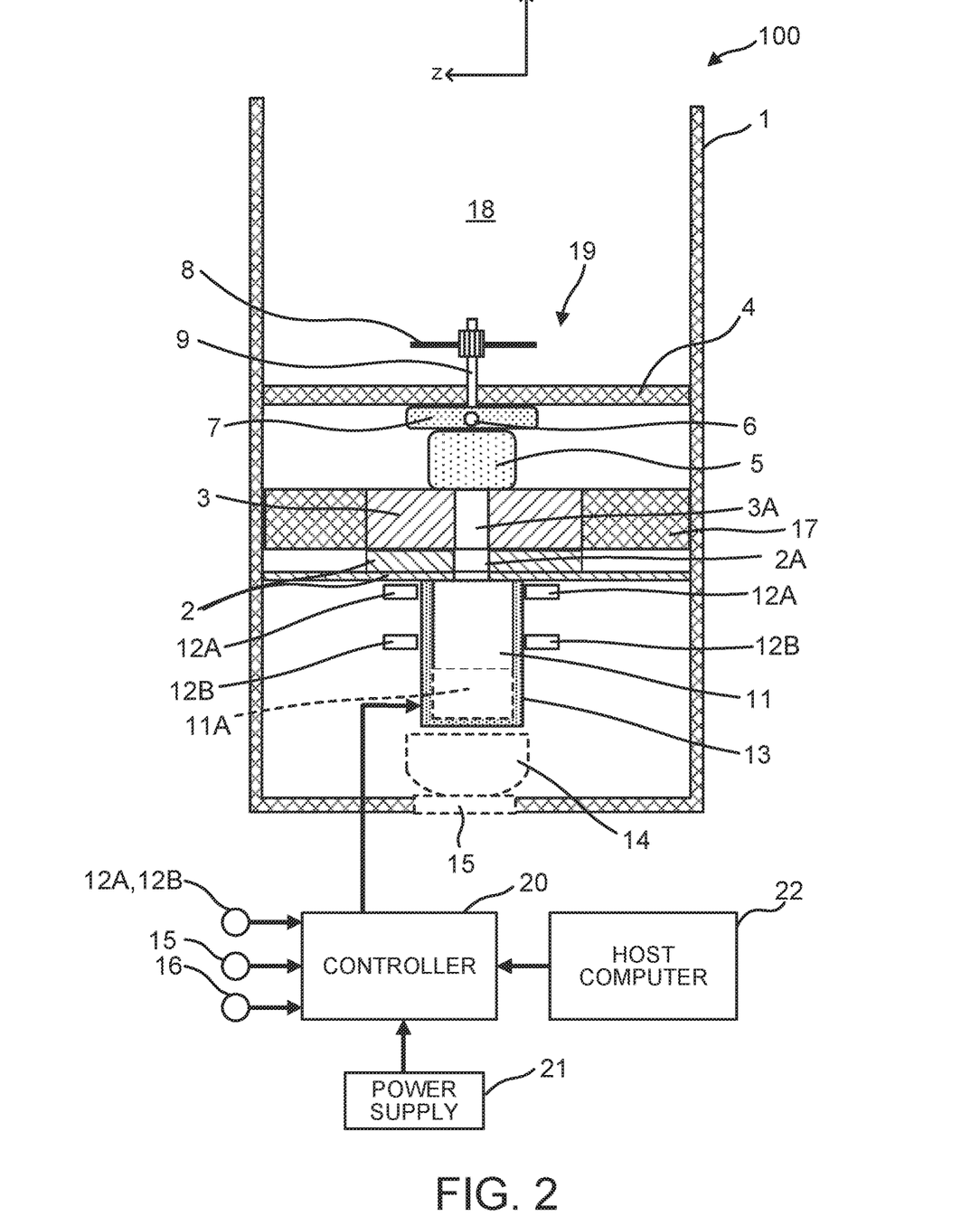
FIG. 2 is a sectional view of the component supply device taken along a line II-II in FIG. 1.

FIG. 1 is a sectional view illustrating a configuration of a component supply device 100 according to one or more embodiments of the present invention. FIG. 2 is a sectional view of the component supply device 100 taken along a line II-II in FIG. 1. In the following description, in the figures, the x-axis direction is assumed to be the lateral direction, and the y-axis direction is assumed to be the up-down direction unless otherwise specified.

Figure 3:
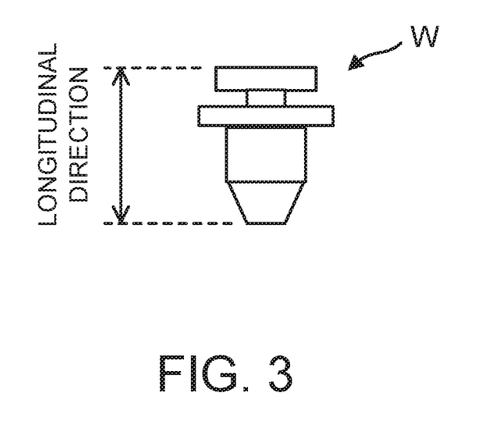
FIG. 3 is a view illustrating an example of a side view of a component.
Figure 4:
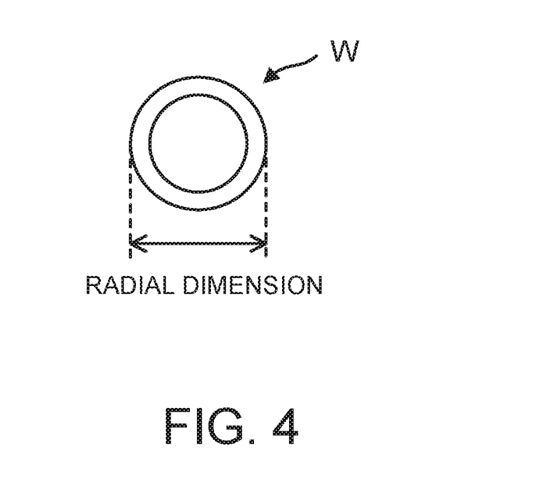
FIG. 4 is a view illustrating an example of a top view of the component.

A component (also referred to as "workpiece") output from the component supply device 100 in one or more embodiments of the present invention is a resin clip W to be used in a step of attaching a trim component and the like to a vehicle body in an assembly line for automobiles. FIG. 3 is a side view illustrating an example of the clip W. FIG. 4 is a top plan view of the clip W. Further, the "longitudinal dimension" and the "radial dimension" of the clip W to be used in the following description are as illustrated in FIGS. 3, 4.

Note that the component supply device 100 of one or more embodiments of the present invention is also usable for a grommet, a bolt, a nut, and the like other than the resin clip W described above.

A housing 1 of the component supply device 100 is formed in a box shape opened upward. Note that a cover for opening and closing an upper opening 4A may be provided.

A fixing plate 2 is fixed to an inner side wall of the housing 1 in an inclined manner. The fixing plate 2 has a via-hole 2A penetrating through the fixing plate 2 from its top face to its bottom face and having a size that allows the clip W to pass through the via-hole 2A. Further, the fixing plate 2 also has a hole through which a rotary shaft of a stepping motor 13 (described later) penetrates.

On a top side of the fixing plate 2, a rotating disk 3 as a movable plate, and a disk enclosure 17 having a top face flush with a top face of the rotating disk 3 are laminated. The disk enclosure 17 is fixed to the inner side wall of the housing 1 in an inclined manner, similarly to the fixing plate 2. The disk enclosure 17 has a through-hole having the same shape as the rotating disk 3, and the rotating disk 3 is placed in the through-hole. The disk enclosure 17 includes a position sensor 16 configured to detect a zero-degree position of the rotating disk 3 as will be described below.

The rotating disk 3 is connected to the rotary shaft of the stepping motor 13 via a fixation collar 10 and rotates by a driving force of the stepping motor 13. In one or more embodiments of the present invention, the rotating disk 3 is connected to the stepping motor 13 such that the rotating axis of the rotating disk 3 and the rotary shaft of the stepping motor 13 are placed coaxially.

A stirring shaft 9 is fixed to the top face of the rotating disk 3 such that its rotating axis corresponds to the rotary shaft of the stepping motor 13. The stirring shaft 9 includes a stirring plate 8 provided near a distal end of the stirring shaft 9 so as to extend in a direction perpendicular to the axial direction of the stirring shaft 9. The stirring shaft 9 and the stirring plate 8 constitute an agitator 19.

The thickness of the rotating disk 3 in the up-down direction is equivalent to or larger than the longitudinal dimension of the clip W. However, the thickness of the rotating disk 3 in the up-down direction is smaller than twice the longitudinal dimension of the clip W.

The rotating disk 3 has a pair of storage holes 3A. The storage holes 3A are columnar holes penetrating through the rotating disk 3 in the up-down direction. The inside diameter of the storage hole 3A is equivalent to or larger than the radial dimension of the clip W. However, the inside diameter of the storage hole 3A is smaller than twice the radial dimension.

The pair of storage holes 3A is provided at an interval of 180 degrees in the circumferential direction of the rotating disk 3. Further, the opening area of the via-hole 2A is equivalent to or larger than the opening area of the storage hole 3A. The via-hole 2A is disposed such that the loci of the openings of the pair of the storage holes 3A at the time when the rotating disk 3 rotates pass the opening of the via-hole 2A, when viewed from above.

The reason why the thickness of the rotating disk 3 and the inside diameter of the storage hole 3A are set as described above is to cause one of two clips W to partially project from the top face of the storage hole 3A when the two clips W enter the storage hole 3A.

A stopper 5 is laminated on a top side of the rotating disk 3. The stopper 5 is supported by the housing 1 via a spring 6. The stopper 5 and the spring 6 form an elastic member. The stopper 5 is placed above the via-hole 2A and is also placed on the loci of the openings of two storage holes 3A at the time when the rotating disk 3 rotates, when viewed from above. The stopper 5 of one or more embodiments of the present invention has a cylindrical shape with a diameter equivalent to or larger than the inside diameter of the storage hole 3A but not larger than about twice the inside diameter.

Above the stopper 5 but below the stirring plate 8, a space retainer plate 4 is fixed to an inner wall surface of the housing 1 in an inclined state similarly to the fixing plate 2, the rotating disk 3, and the disk enclosure 17. An opening 4A is provided between a lowest-side end of the space retainer plate 4 in the vertical direction and the inner wall surface of the housing 1. Note that the space retainer plate 4 is made of a transparent acrylic board. Since the space retainer plate 4 is transparent, a state below the space retainer plate 4 can be easily viewed, and when abnormality or the like occurs in movement of the rotating disk 3, for example, it is possible to deal with the abnormality immediately.

A weight plate 7 is disposed between a bottom face of the space retainer plate 4 and a top face of the stopper 5. The weight plate 7 is configured to restrict the moving direction of the stopper 5 so that the stopper 5 moves along the top face of the disk enclosure 17. Note that, in a case where the elastic member has a configuration different from one or more embodiments of the present invention and the moving direction of a part corresponding to the stopper 5 can be directly restricted by the space retainer plate 4, the weight plate 7 is not an essential constituent.

A slider 11 via which the via-hole 2A communicates with the outside of the housing 1 is disposed on a bottom side of the fixing plate 2. Two workpiece count sensors 12A, 12B are disposed on the slider 11. Each of the workpiece count sensors 12A, 12B is constituted by a light-emitting element and a light-receiving element provided in a pair so as to sandwich the slider 11 and is configured to detect that the clip W has passed when the clip W has passed between the light-emitting element and the light-receiving element to block light. The two workpiece count sensors 12A, 12B are disposed at a predetermined interval in a direction where the clip W flows. Then, when at least one of the two workpiece count sensors 12A, 12B detects that the clip W has passed in a predetermined time set in advance, a controller 20 (described below) performs count-up.

Note that, in a case where only one workpiece count sensor is provided, when the clip W has a complicated shape as illustrated in FIG. 3, such a situation may occasionally happen that the clip W rotates and passes between the light-emitting element and the light-receiving element to avoid light and detection error occurs. In view of this, in one or more embodiments of the present invention, in order to prevent detection error, two sensors are provided as described above. Further, in order to avoid redundant counting, when the two workpiece count sensors 12A, 12B both detect that the clip W has passed in the predetermined time, the controller 20 increases a counter value by 1.

A tray 14 configured to receive the clip W output via the slider 11, and a weight sensor (hereinafter referred to as "workpiece check sensor") 15 configured to determine whether the clip W is put in the tray 14 or not are disposed outside the housing 1 and below an outlet 11A of the slider 11.

The controller 20 reads information from a host computer 22 and signals from the workpiece count sensors 12A, 12B, the position sensor 16, and the workpiece check sensor 15, and controls driving of the stepping motor 13. Details of the control will be described later. Note that the controller 20 and the stepping motor 13 are operated by electric power supplied from a power supply 21.

Note that the controller 20 is constituted by a microcomputer including a central processing unit (CPU), a read only memory (ROM), a random access memory (RAM), and an input-output interface (I/O interface). The controller 20 can be constituted by a plurality of microcomputers.

Next will be described the movement of the rotating disk 3.

FIGS. 5(a)-5(d) show the rotating disk 3, the disk enclosure 17, and the stopper 5 viewed from above. Note that, in order to distinguish the two storage holes 3A from each other, they are referred to as a first storage hole 3A-1 and a second storage hole 3A-2, respectively.

Figure 5A:
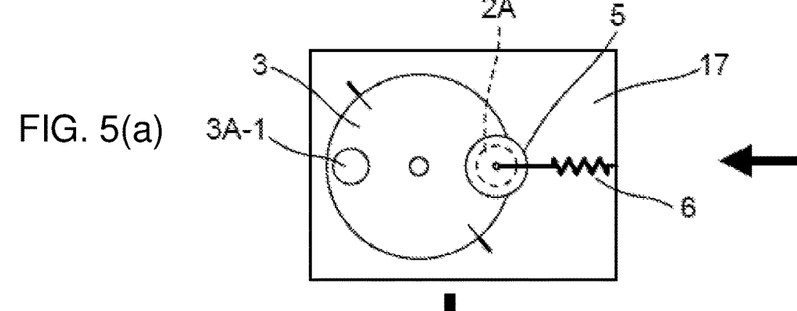
FIGS. 5(a)-5(d) show an operation of a movable plate.

At the time of the operation start of the component supply device 100, the first storage hole 3A-1 is placed on an opposite side from the stopper 5 across the rotation center of the rotating disk 3 as illustrated in FIG. 5(a). The second storage hole 3A-2 is placed below the stopper 5. This state is referred to as a zero position. Note that, in a case where the rotating disk 3 deviates from the zero position at the time of the operation start, the controller 20 starts the operation after performing zero-position adjustment to return the rotating disk 3 to the zero position. The zero-position adjustment is performed based on a detection value of the position sensor 16 as a starting position check sensor. For example, a mark such as a notch or a projection is provided in the rotating disk 3, and by disposing the position sensor 16 at a position facing the mark at the time when the rotating disk 3 is placed at the zero position, it is possible to detect whether the rotating disk 3 is placed at the zero position or not.

Figure 5B:
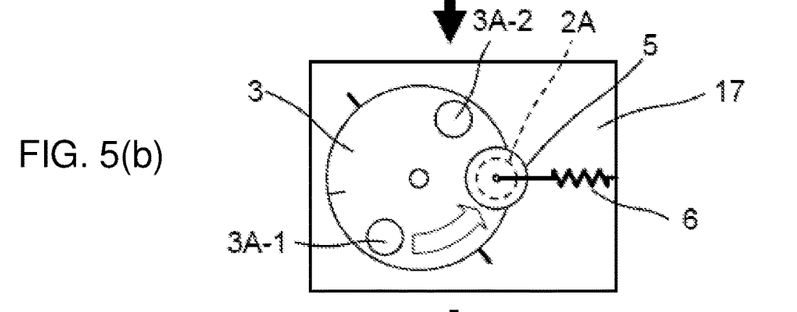
Figure 5C:
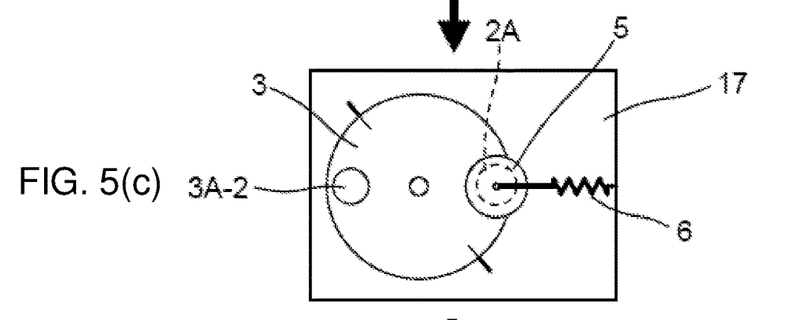
Figure 5D:
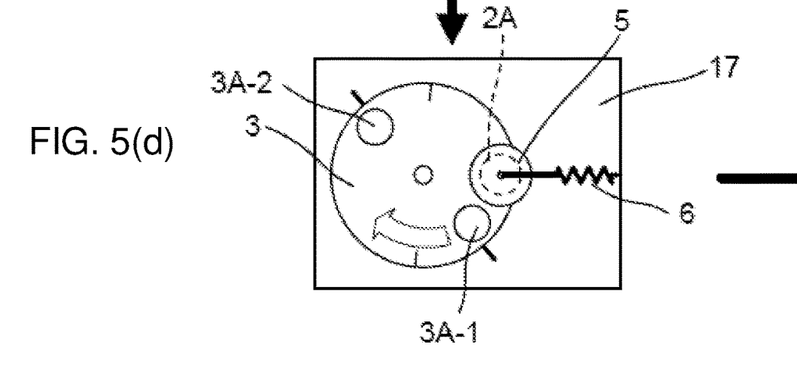

When the zero-position adjustment is finished, the rotating disk 3 rotates counterclockwise in the figure as illustrated in FIG. 5(b). Then, as illustrated in FIG. 5(c), when the rotating disk 3 rotates by 180 degrees and the first storage hole 3A-1 reaches above the via-hole 2A, the rotating disk 3 stops rotating. After that, as illustrated in FIG. 5(d), the rotating disk 3 reverses its rotation direction and rotates clockwise in the figure by 180 degrees, so that the rotating disk 3 returns to the zero position. Hereafter, this operation is performed repeatedly.

Figure 6:
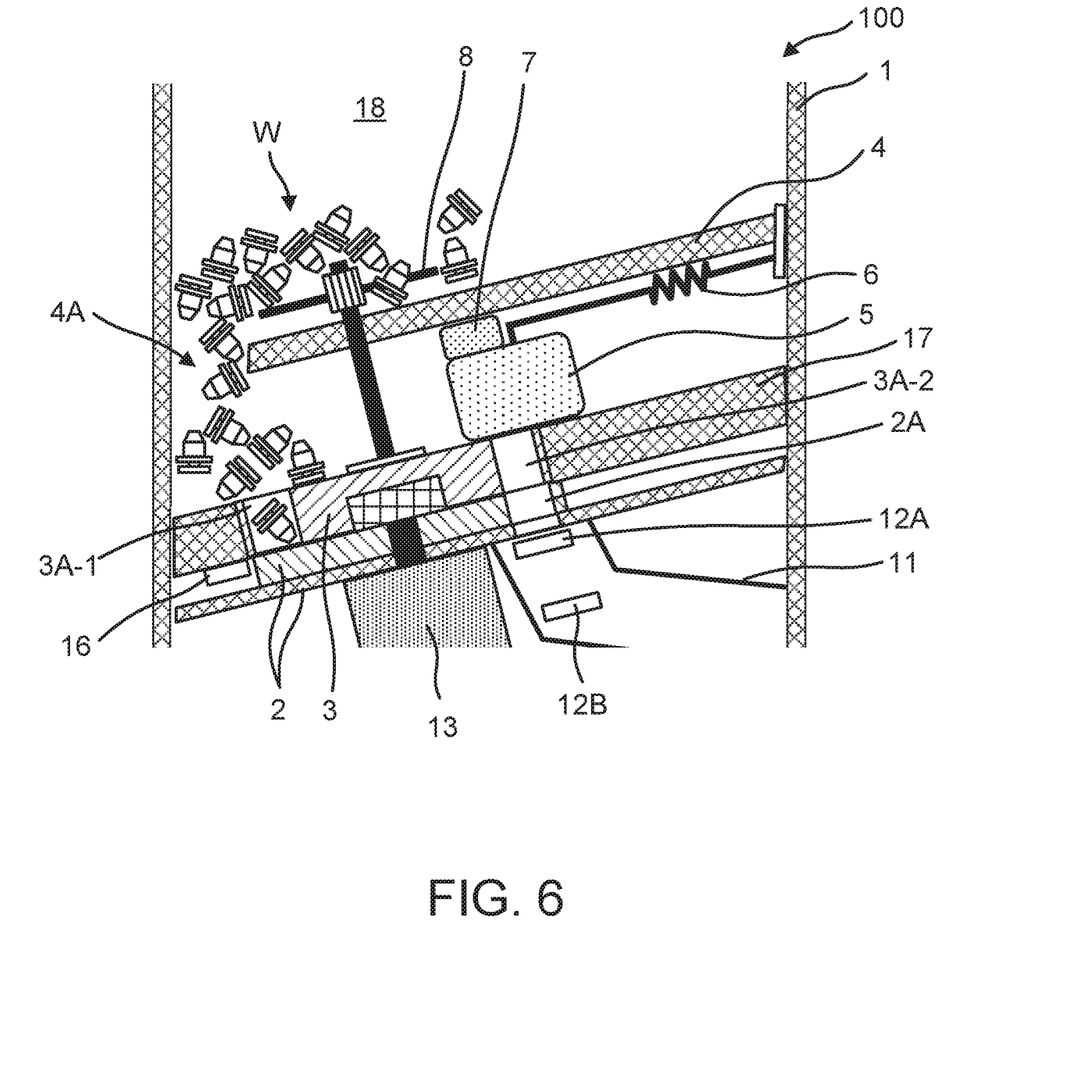
FIG. 6 is a view to describe the course before the component enters a storage hole.
Figure 7:
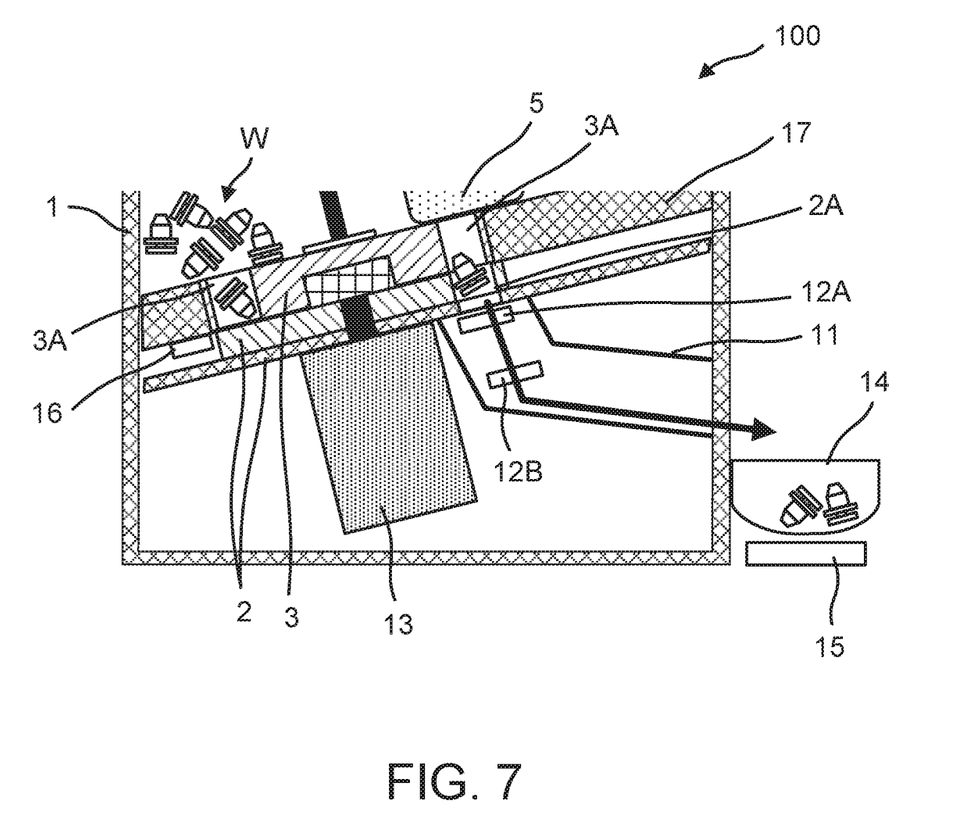
FIG. 7 is a view to describe the course before the component is stored in a tray.

Note that, in one or more embodiments of the present invention, the rotating disk 3 includes two storage holes 3A, but the rotating disk 3 may include one storage hole 3A. In this case, it should be considered that the rotating disk 3 includes only the first storage hole 3A-1. That is, at the zero position, the rotating disk 3 enters a first state in which a top side of the first storage hole 3A-1 is opened and a bottom side thereof is closed by the fixing plate 2, and when the rotating disk 3 rotates by 180 degrees, the rotating disk 3 enters a second state in which the first storage hole 3A-1 communicates with the via-hole 2A and the clip W is movable from the first storage hole 3A-1 to the via-hole 2A Next will be described the operation of the component supply device 100 to supply the clip W with reference to FIGS. 6, 7. FIGS. 6, 7 are sectional views similar to FIG. 1.

When many clips W are put into a housing portion 18, some of the clips W pass through the opening 4A and reach the top faces of the rotating disk 3 and the disk enclosure 17. Then, one of the clips W is stored in the first storage hole 3A-1 by deadweight. When the rotating disk 3 rotates from this state and the first storage hole 3A-1 reaches above the via-hole 2A, the clip W falls from the first storage hole 3A-1 and reaches the tray 14 through the via-hole 2A and the slider 11. At this time, a clip W is stored in the second storage hole 3A-2. Then, when the rotation direction of the rotating disk 3 is reversed and the second storage hole 3A-2 reaches above the via-hole 2A, the clip W stored in the second storage hole 3A-2 is output via the via-hole 2A and the slider 11. This operation is repeated until a necessary number of clips W to be used for a work operation are output. Further, inside the housing portion 18, the clips W are stirred by the stirring plate 8 rotationally driven by the stepping motor 13. Hereby, entanglement between the clips is broken.

In the meantime, in the component supply device 100 of one or more embodiments of the present invention, the clip W is stored in the storage hole 3A by use of the deadweight of the clip W. On this account, in order that the clip W easily enters the storage hole 3A, the size of the storage hole 3A should be made slightly larger than the size of the clip W. However, when the size of the storage hole 3A is set as such, the following state may occur. That is, although one clip W is present in the storage hole 3A, another clip W may further enter an excessive space in the storage hole 3A, and the clip W entering afterward may partially project from the top face of the rotating disk 3. If the storage hole 3A communicates with the via-hole 2A in such a state, two clips W are output at the same time, so that it is difficult to count an exact number of clips. However, in the component supply device 100 of one or more embodiments of the present invention, the clips W can be output one by one as described below.

FIGS. 8(a)-8(d) show the operation when an excessive clip W enters the storage hole 3A. Note that FIGS. 8(a)-8(d) show views enlarging a part around the via-hole 2A in FIGS. 6, 7.

Figures 8, 8C:
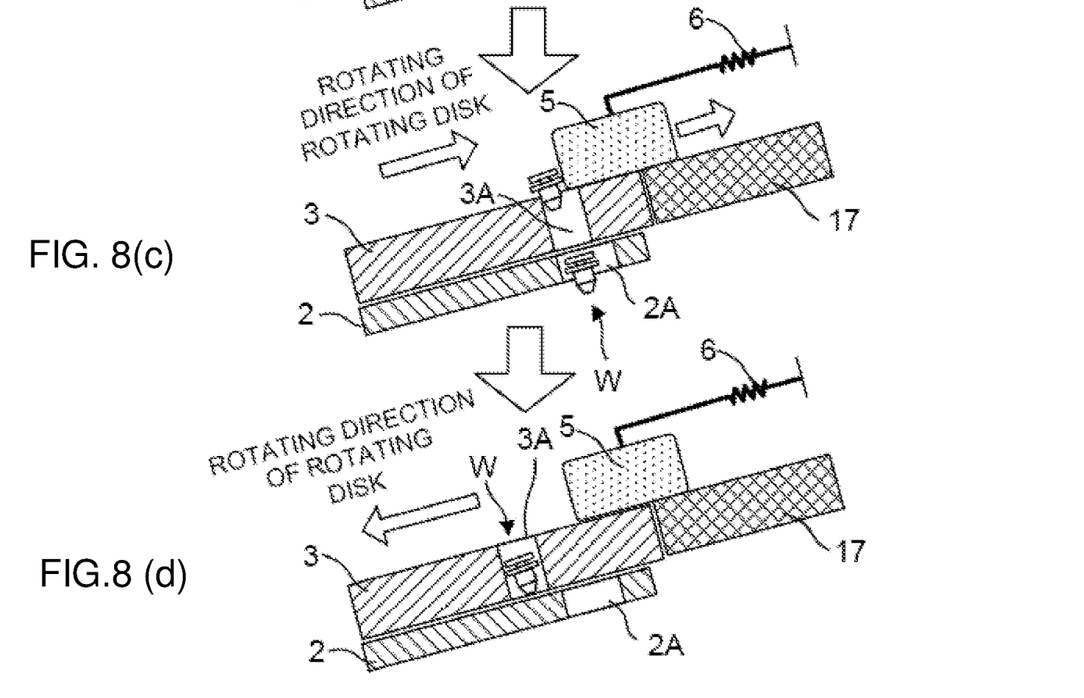
Figure 8A:
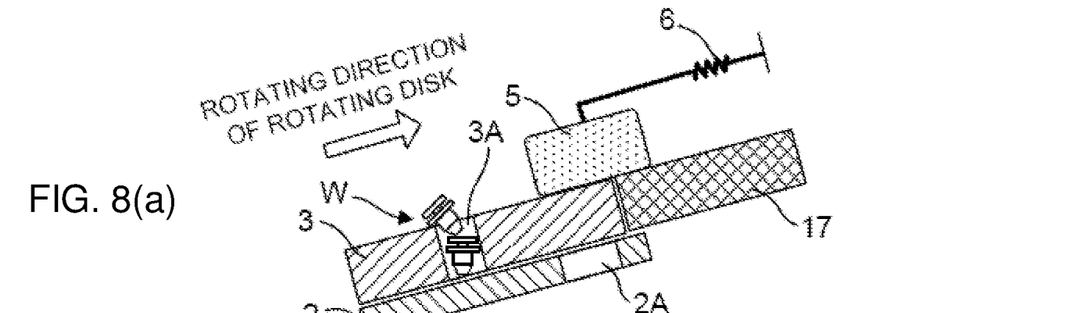
Figure 8B:
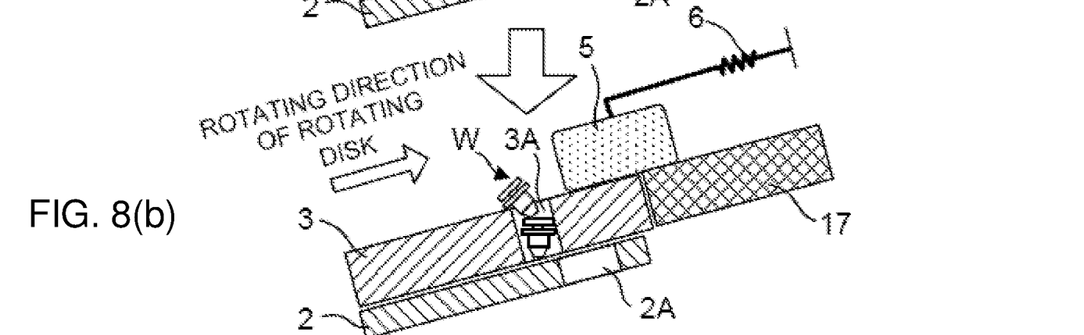

As illustrated in FIG. 8(a), when two clips W enter the storage hole 3A, the rotating disk 3 rotates and the storage hole 3A approaches the via-hole 2A in a state where one of the clips W partially projects from the top face of the rotating disk 3, the clip W thus projecting as illustrated in FIG. 8(b) eventually comes into contact with the stopper 5. When the rotating disk 3 continues rotating in that state, the clip W thus projecting is cleared out from the storage hole 3A by the stopper 5 or is sandwiched between the stopper 5 and an inner wall of the storage hole 3A due to an elastic force of the spring 6. Note that the reason why the clip W can be sandwiched as described above is that the moving direction of the stopper 5 is restricted by the weight plate 7 to a direction parallel to the top face of the rotating disk 3. When the storage hole 3A reaches above the via-hole 2A in the state where the clip W is sandwiched, only the clip W stored first in the storage hole 3A passes through the via-hole 2A as illustrated in FIG. 8(c). Then, when the rotation direction of the rotating disk 3 is reversed and the storage hole 3A is distanced from the stopper 5, the elastic force of the spring 6 gradually decreases, and the sandwiched clip W eventually falls into the storage hole 3A as illustrated in FIG. 8(d). The clip W thus falling into the storage hole 3A is output via the via-hole 2A and the slider 11, when the rotation direction of the rotating disk 3 is reversed again and the storage hole 3A reaches above the via-hole 2A.

Note that, even in a configuration where the rotating disk 3 continues rotating unidirectionally without reversing the rotation direction, the excessive clip W can be removed by the stopper 5 or the excessive clip W can be sandwiched between the stopper 5 and a wall surface of the storage hole 3A, so that the clips W can be output one by one. However, when the rotating disk 3 continues rotating unidirectionally in the state where the clip W is sandwiched, the elastic force of the spring 6 continues increasing even after the storage hole 3A passes above the via-hole 2A. When the distance between the storage hole 3A and the stopper 5 becomes a size with which the clip W cannot be sandwiched, the stopper 5 is to return to its original position due to the elastic force. At this time, the sandwiched clip W is flicked by the stopper 5, so that the clip W is not stored in the storage hole 3A. In comparison with this, when the rotation direction is reversed every 180 degrees like one or more embodiments of the present invention, the elastic force decreases as the storage hole 3A is distanced from the stopper 5, and when the distance between the storage hole 3A and the stopper 5 becomes a size with which the clip W cannot be sandwiched, the elastic force becomes zero, so that the clip W easily falls into the storage hole 3A.

As described above, in the component supply device 100 of one or more embodiments of the present invention, the storage hole 3A is set to a size that causes one of two clips W to project from the top face of the rotating disk 3 when the two clips W enter the storage hole 3A, and the stopper 5 configured to clear out the projecting clip W or cause the projecting clip W to be sandwiched between the stopper 5 and the wall surface of the storage hole 3A is provided. Hereby, even if two clips W enter the storage hole 3A, the clips W can be output one by one via the via-hole 2A and the slider 11.

Further, a force that biases the clip W when the clip W is sandwiched between the stopper 5 and the wall surface of the storage hole 3A is the elastic force of the spring 6. In view of this, the spring 6 is configured to have a size that allows the clip W to be sandwiched without deforming or damaging the clip W and without dropping the clip W.

Note that one or more of the above embodiments describes an example in which the stopper 5 and the spring 6 constitute the elastic member, but the present embodiment is not limited to this. For example, the stopper 5 may be made of a member having elasticity, and the stopper 5 may be supported by just a bar-shaped member. Further, a configuration that yields the above effect may be constituted by only a member having an elastic force such as a rubber or a leaf spring.

Next will be described the control on the component supply device 100 by the controller 20.

Figure 9:
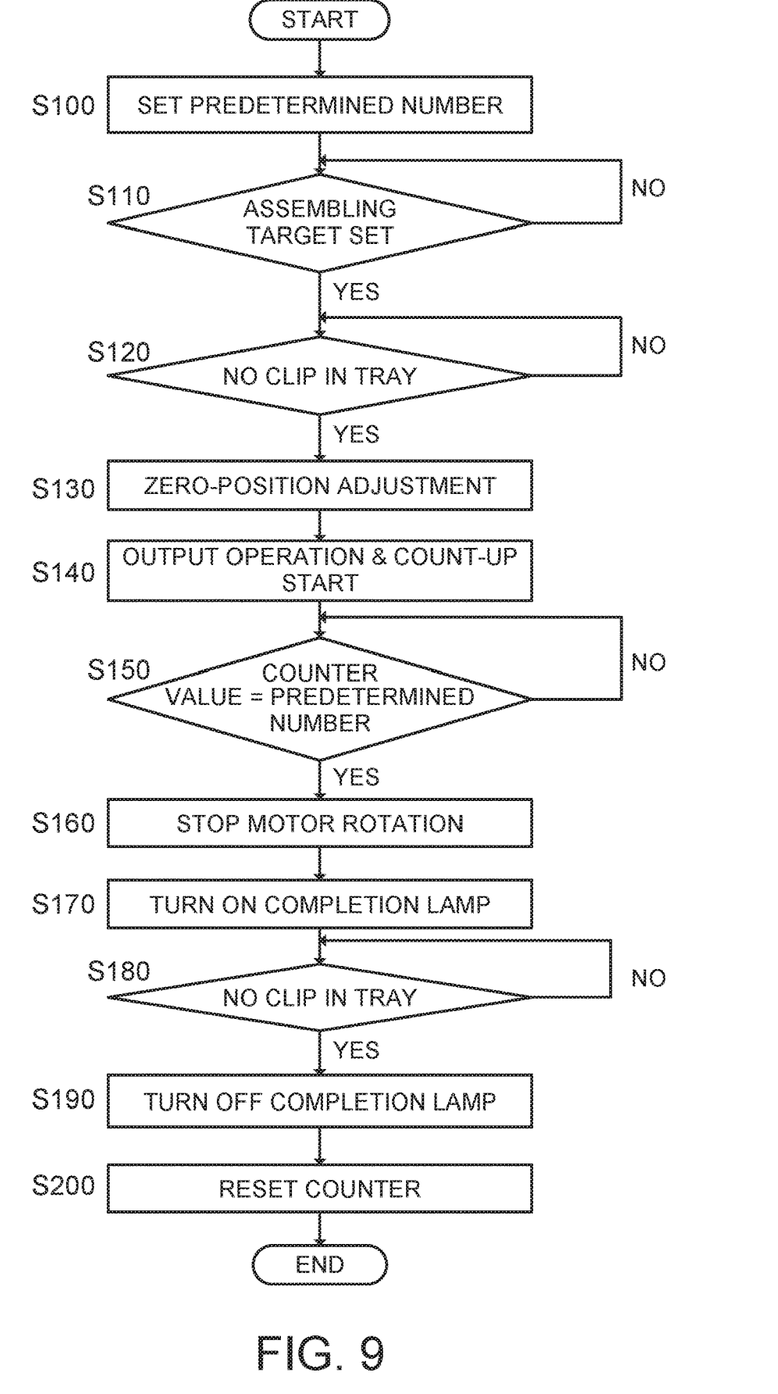
FIG. 9 is a flowchart illustrating a control routine of the component supply device, the control routine being programmed by a controlling portion.

FIG. 9 is a flowchart of a control routine executed by the controller 20. This control routine is programed in advance by the controller 20. The following describes the control routine in accordance with steps.

In step S100, the controller 20 sets the number of components to be used in a current work operation, that is, the number (hereinafter also referred to as "predetermined number") of clips W to be output this time. More specifically, a predetermined number for each type of a vehicle is stored in advance in the controller 20, and the controller 20 reads a type of a vehicle to be assembled from the host computer 22 managing an entire vehicle assembly line and sets a predetermined number corresponding to the type of the vehicle.

In step S110, the controller 20 determines whether or not an assembling target is set at a work position, and when the assembling target is set, the controller 20 executes a process of step S120. The determination on whether or not the assembling target is set is performed based on a detection value from a sensor (not shown) provided at the work position.

In step S120, the controller 20 determines whether or not a clip W is present in the tray 14, based on a signal from the workpiece check sensor 15, and when no clip W is present in the tray 14, the controller 20 executes a process of step S130, but when a clip W is present in the tray 14, the controller 20 repeats the determination.

In step S130, the controller 20 executes the zero-position adjustment.

In step S140, the controller 20 performs an output operation and starts count-up of the number of output clips. The output operation is to repeat the operation in which the rotating disk 3 is rotated counterclockwise from the zero position by 180 degrees, and then, the rotation direction is reversed to rotate the rotating disk 3 by 180 degrees, as described above with reference to FIGS. 5(a)-5(d).

In step S150, the controller 20 determines whether the number of clips thus counted (a counter value) reaches the predetermined number or not. When the number of clips reaches the predetermined number, the controller 20 executes processes of step S160 and its subsequent steps, and when the number of clips does not reach the predetermined number, the controller 20 repeats the determination.

In step S160, the controller 20 stops the rotation of the stepping motor 13, and in step S170, the controller 20 turns on a completion lamp that informs an operator that the predetermined number of clips have been output. When the controller 20 determines, in step S180, that there is no clip W in the tray 14, that is, when the controller 20 determines that the operator has taken out the clip W from the tray 14, the controller 20 turns off the completion lamp in step S190 and resets the counter in step S200 to finish this routine.

By executing the control routine, the component supply device 100 outputs only the predetermined number of clips W from the housing portion 18.

Next will be described a modification of one or more of the above embodiments.

(Modification 1)

Figures 10A, 10B:
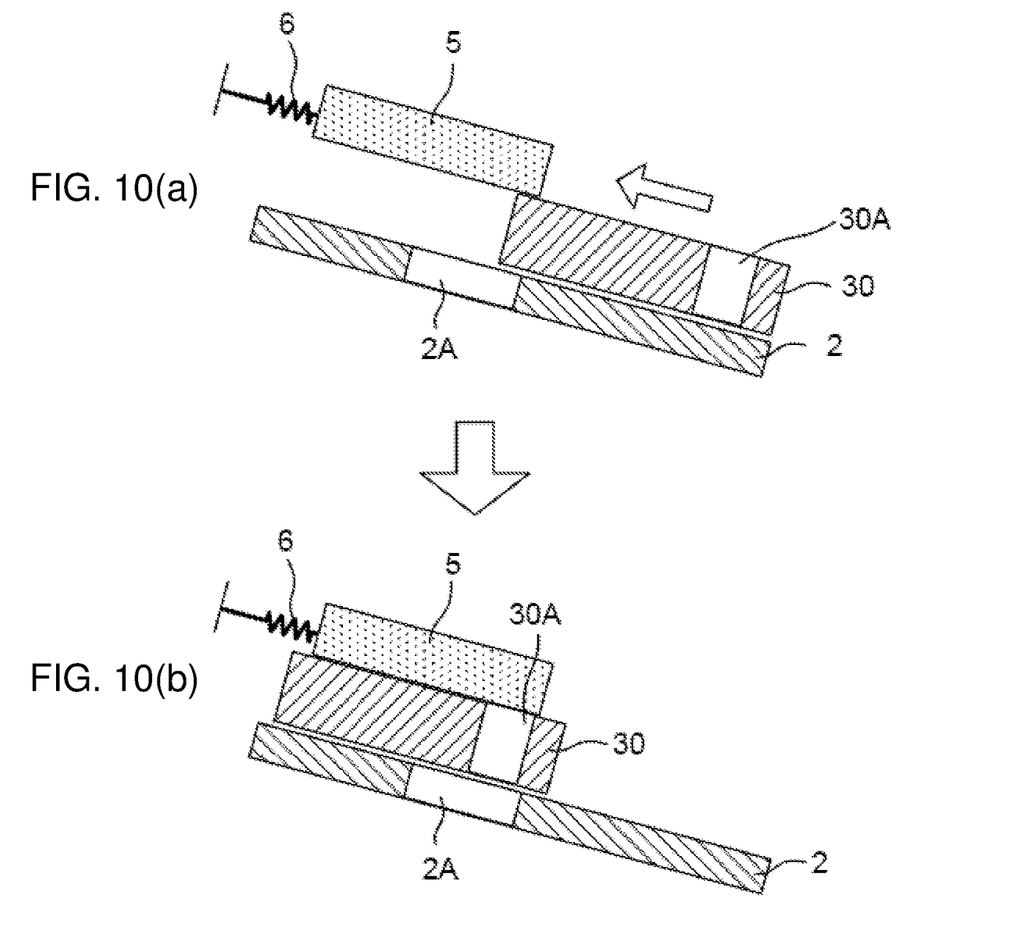
FIGS. 10(a)-10(b) show an operation of Modification 1.

FIGS. 10(a)-10(b) show a first modification. FIGS. 10(a)-10(b) illustrate only the stopper 5 and the spring 6 as the elastic member, the fixing plate 2, and a movable board 30 as the movable plate. In this modification, the movable board 30 is used instead of the rotating disk 3 and the disk enclosure 17. The housing 1, the slider 11, the space retainer plate 4, and so on are configured in a similar manner to those in FIGS. 1, 2.

In the configuration of FIGS. 10(a)-10(b), the movable board 30 reciprocates linearly. The movable board 30 is driven by the stepping motor 13 via a mechanism of a rack and a pinion, or the like.

In an initial state, as illustrated in FIG. 10(a), the movable board 30 is placed near a lower side end of the inclined fixing plate 2, and here, the clip W enters a storage hole 30A by deadweight. As illustrated in FIG. 10(b), the movable board 30 moves along the top face of the fixing plate 2 until the storage hole 30A reaches the via-hole 2A. Then, the clip W falls from the storage hole 30A and passes through the via-hole 2A. After that, the movable board 30 reverses its travelling direction and moves back to the initial state. This operation is repeated afterward until a predetermined number of clips W are output.

Even in this modification, when two clips W enter the storage hole 30A, the clip W projecting from the storage hole 30A is removed by the stopper 5 or is sandwiched between the stopper 5 and a wall surface of the storage hole 30A, so that the two clips W do not pass through the via-hole 2A collectively. Further, when the movable board 30 moves to be distanced from the stopper 5, the clip W thus sandwiched enters the storage hole 30A.

(Modification 2)

In Modification 2, a basic configuration is the same as the configuration illustrated in FIGS. 1, 2, and so on. However, the size of the storage hole 3A is a size that allows the storage hole 3A to receive a plurality of clips W and is a size that causes an excessive clip W to partially project from the top face of the rotating disk 3 when more clips W than the above enter the storage hole 3A.

Even in this case, the excessive clip W is removed by the stopper 5 or is sandwiched between the stopper 5 and the wall surface of the storage hole 30A, so that the plurality of clips W, the number of which is set in advance, can be output at a time.

Note that, when the plurality of clips W is output at a time like this modification, the plurality of clips W may pass through the workpiece count sensors 12A, 12B at the same time or in an extremely short time. In such a case, it is difficult to exactly detect the number of clips W that have passed through the workpiece count sensors 12A, 12B. In view of this, the weight (hereinafter also referred to as "unit weight") of one clip is stored in advance in the controller 20, and when the weight detected by the workpiece check sensor 15 is equal to a value obtained by multiplying the unit weight by the predetermined number, the controller 20 determines that the predetermined number of clips W have been output.

(Modification 3)

In this modification, the fixing plate 2, the rotating disk 3, and so on that are inclined in FIG. 1, etc., are disposed horizontally. Even in this case, the clip W enters the storage hole 3A by deadweight, so that the same effect as one or more of the above embodiments is yielded. However, when those members are inclined like FIG. 1, etc., the clip W falling from the housing portion 18 or the clip W removed from the storage hole 3A by the stopper 5 easily gathers on a lower side on an inclined surface and easily enters the storage hole 3A.

Next will be described effects that one or more embodiments of the present invention may achieve.

The component supply device 100 of one or more embodiments of the present invention includes the fixing plate 2 having the via-hole 2A through which the clip W (a component) passes, the fixing plate 2 being fixed to an inner part of the housing 1, and the rotating disk (movable plate) 3 having the storage hole 3A penetrating through the rotating disk 3 in the up-down direction and having a size that allows the clip W to be stored in the storage hole 3A, the rotating disk 3 being laminated on the top side of the fixing plate 2 and configured such that the storage hole 3A moves relative to the via-hole 2A in a direction parallel to the top face of the fixing plate 2. Further, the component supply device 100 includes the controller (controlling portion) 20 configured to control the operation of the rotating disk 3, and the stopper 5 and the spring 6 as the elastic member disposed on the top side of the rotating disk 3 and configured to elastically deform in a direction parallel to the top face of the rotating disk 3. The controller 20 repeatedly performs the following operations until the predetermined number of clips W are output: a forward-direction operation of moving the rotating disk 3 from the first state in which the top side of the storage hole 3A is opened and the bottom side thereof is closed by the fixing plate 2 to the second state in which the storage hole 3A communicates with the via-hole 2A and the clip W is movable from the storage hole 3A to the via-hole 2A; and a reverse-direction operation of returning the rotating disk 3 to the first state by reversing the moving direction of the rotating disk 3 when the rotating disk 3 enters the second state. Further, when the rotating disk 3 moves in a state where the clip W partially projects from the upper end of the storage hole 3A, the elastic member removes the projecting clip W from the storage hole 3A before the rotating disk 3 enters the second state, or the elastic member elastically deforms by being pressed by the projecting clip W to cause an elastic force by which the projecting clip W is sandwiched between the elastic member and the wall surface of the storage hole 3A while the rotating disk 3 is in the second state. With such a configuration, the component supply device 100 can output the clips W one by one. Further, the clip W projecting from the storage hole 3A is sandwiched between the stopper 5 and the wall surface of the storage hole 3A due to the elastic force of the spring 6, and when the rotating disk 3 is returned from the second state to the first state, the elastic force is canceled, so that the clip W is stored in the storage hole 3A. Accordingly, the clip W is efficiently stored in the storage hole 3A without being damaged.

The component supply device 100 of one or more embodiments of the present invention further includes the space retainer plate 4 disposed inside the housing 1 so as to be fixed above the stopper 5, and a communication portion via which a part above the space retainer plate 4 communicates with a part below the space retainer plate 4. Hereby, a space where the stopper 5 moves is secured, so that a large number of clips W can be put into the housing portion 18.

In one or more embodiments of the present invention, the fixing plate 2, the rotating disk 3, the disk enclosure 17, and so on are inclined such that the position of the storage hole 3A in the vertical direction becomes higher in the second state than in the first state, and the space retainer plate 4 is inclined in the same direction as the fixing plate 2 and the rotating disk 3. Hereby, the clips W gather at a low position and easily enter the storage hole 3A. Further, the clips W put into the housing portion 18 easily move to the opening 4A.

In one or more embodiments of the present invention, a rotation angle of the rotating disk 3 from the first state to the second state is 180°, and the rotating disk 3 has the first storage hole 3A-1 and the second storage hole 3A-2 entering the second state when the first storage hole 3A-1 is in the first state. Hereby, the clip W can be more efficiently output as compared to a case where only one storage hole 3A is provided.

In one or more embodiments of the present invention, the controller 20 performs position adjustment (the zero-position adjustment) to adjust the rotating disk 3 to enter the first state before the rotating disk 3 starts working. In a case where the rotation angle of the rotating disk 3 deviates for some reasons and the rotating disk 3 is not in the first state at the time of the operation start, if the rotating disk 3 starts working in that state, either one of the storage holes 3A does not reach above the via-hole 2A, so that the either one of the storage holes 3A cannot function to output the clip W. However, in one or more embodiments of the present invention, the rotating disk 3 starts working after the zero-position adjustment is performed, so that the clips W can be output from the two storage holes 3A.

The component supply device 100 of one or more embodiments of the present invention includes the agitator 19 on the top side of the space retainer plate 4. Hereby, even if many clips W are put into the housing portion 18, entanglement between clips can be broken.

The embodiments of the present invention are described above, but the above embodiments are merely examples of some applications of the present invention, and are not intended to limit the technical scope of the present invention to the concrete configuration of the above embodiment. While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A component supply device configured to output a predetermined number of components to be used in a work operation, the component supply device comprising:
    a fixing plate having a via-hole through which the components pass, the fixing plate being fixed to a housing;
    a movable plate having a storage hole penetrating through the movable plate in an up-down direction and having a size that allows the predetermined number of components to be stored, the movable plate being laminated on a top side of the fixing plate and configured to move such that the storage hole moves relative to the via-hole in a direction parallel to a top face of the fixing plate;
    a controller configured to control an operation of the movable plate;
    an elastic member placed on a top side of the movable plate and configured to elastically deform in a direction parallel to a top face of the movable plate;
    a space retainer plate disposed inside the housing so as to be fixed above the elastic member; and
    an opening via which a part above the space retainer plate communicates with a part below the space retainer plate,
    wherein the controller repeatedly performs, until the predetermined number of components are output:
        a forward-direction operation of moving the movable plate from a first state in which a top side of the storage hole is opened and a bottom side of the storage hole is closed by the fixing plate to a second state in which the storage hole communicates with the via-hole and the components are movable from the storage hole to the via-hole, and
        a reverse-direction operation of returning the movable plate to the first state by reversing a moving direction of the movable plate when the movable plate enters the second state,
    wherein, when the movable plate moves in a state where an excessive component enters the storage hole and the component partially projects from an upper end of the storage hole, the elastic member hits the component to remove the projecting component from the storage hole before the movable plate enters the second state, or the elastic member elastically deforms by being pressed by the projecting component, so that, while the movable plate is in the second state, the projecting component is sandwiched between the elastic member and a wall surface of the storage hole due to an elastic force caused by the elastic deformation,
    wherein the forward-direction operation is in one of a clockwise direction and a counterclockwise direction, and the reverse-direction operation is in the other of the clockwise direction and the counterclockwise direction, and
    wherein the controller performs position adjustment to adjust the movable plate to the first state before the movable plate starts working.

2. The component supply device according to claim 1, wherein the fixing plate and the movable plate are inclined such that a position of the storage hole in a vertical direction becomes higher in the second state than in the first state, and
    wherein the space retainer plate is inclined in the same direction as the fixing plate and the movable plate.

3. The component supply device according to claim 1, wherein the movable plate is a rotating disk in which a rotation angle from the first state to the second state is 180°, and
    wherein the movable plate has a first storage hole and a second storage hole entering the second state when the first storage hole is in the first state.

4. The component supply device according to claim 1, further comprising an agitator provided on a top side of the space retainer plate.

\* \* \* \* \*